(12) United States Patent
Suzuki

(10) Patent No.: US 9,979,340 B2
(45) Date of Patent: May 22, 2018

(54) APPARATUS FOR CONTROLLING THREE PHASE ROTARY ELECTRIC MACHINE REDUCING PEAK VALUE OF PHASE CURRENT

(71) Applicant: DENSO CORPORATION, Kariya, Aichi-pref. (JP)

(72) Inventor: Takashi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 15/628,404

(22) Filed: Jun. 20, 2017

(65) Prior Publication Data

US 2017/0373627 A1    Dec. 28, 2017

(30) Foreign Application Priority Data

Jun. 22, 2016 (JP) ................ 2016-123417

(51) Int. Cl.
| | | |
|---|---|---|
| H02P 23/00 | (2016.01) | |
| H02P 25/00 | (2006.01) | |
| H02P 27/00 | (2006.01) | |
| H02P 21/20 | (2016.01) | |
| H02P 27/04 | (2016.01) | |
| H02P 27/05 | (2006.01) | |
| H02P 6/10 | (2006.01) | |

(52) U.S. Cl.
CPC ............... *H02P 21/20* (2016.02); *H02P 6/10* (2013.01); *H02P 27/04* (2013.01); *H02P 27/05* (2013.01)

(58) Field of Classification Search
CPC ............. H02P 21/20; H02P 6/10; H02P 27/04
USPC ........................................ 318/809
See application file for complete search history.

(56) References Cited

U.S. PATENT DOCUMENTS

| | | |
|---|---|---|
| 2012/0049782 A1 | 3/2012 | Suzuki |
| 2012/0139461 A1 | 6/2012 | Suzuki et al. |
| 2014/0062375 A1 | 3/2014 | Suzuki |
| 2016/0315577 A1 | 10/2016 | Suzuki |

FOREIGN PATENT DOCUMENTS

| | | |
|---|---|---|
| JP | 2014-121189 | 6/2014 |
| JP | 5672278 B2 | 1/2015 |

*Primary Examiner* — Erick Glass
(74) *Attorney, Agent, or Firm* — Knobbe, Martens, Olson & Bear, LLP

(57) ABSTRACT

A control apparatus for driving a three-phase rotary electric machine that generates torque including magnet torque and reluctance torque is provided. AC current supplied to two winding groups of the rotary electric machine have the same amplitude and the mutually different phases defined as 30±60×n[deg]. The control unit calculates d-axis current and q-axis current of 6 (2k+1)th order component superposed on a fundamental wave component on dq coordinate, to reduce a peak of the first order component in the phase current, thereby controlling the three-phase rotary electric machine. The control unit calculates current such that an amplitude of the q-axis current of the 6 (2k+1)th order component is larger than an amplitude of the d-axis current of the 6 (2k+1)th order component.

4 Claims, 13 Drawing Sheets

$R(Iq_6)$ : 4%

$R(Iq_6)$ : 4.4%

APPARATUS FOR CONTROLLING THREE PHASE ROTARY ELECTRIC MACHINE REDUCING PEAK VALUE OF PHASE CURRENT

CROSS-REFERENCE TO RELATED APPLICATION

This application is based on and claims the benefit of priority from earlier Japanese Patent Application No. 2016-123417 filed Jun. 22, 2016, the description of which is incorporated herein by reference.

TECHNICAL FIELD

The present disclosure relates to a control apparatus for a three-phase rotary electric machine.

DESCRIPTION OF THE RELATED ART

Generally, for multi-phase rotary electric machines, a relationship between an amount of current being conducted in the windings and the output torque is that the larger the conduction current, the larger the output torque. However, when a large current flows through the windings, a large amount of heat is produced and may cause a degradation of the rotary electric machine or may cause a malfunction in the rotary electric machine.

In this respect, a technique is known where a harmonic current component is superposed on a fundamental wave which is the first order phase current component, whereby the peak value of the phase current is reduced and heat caused by the current peak value is reduced.

For example, Japanese Patent No. 5672278 discloses a technique used for a three-phase rotary electric machine having two winding groups, in which current having predetermined phase differences is supplied to two winding groups, whereby 6th order torque ripples caused by 5th order harmonic components are cancelled and the peak value of the phase current is reduced. In this technique, a 6th order dq-axis current to be superposed on 0th order components in the dq-coordinate system is calculated, thereby generating 5th order harmonic components to be superposed on the first order component of the phase current.

The technique of the above-mentioned technique of the patent document is to reduce torque ripples of the magnet torque, assuming a surface magnet type rotary electric machine being mainly used. However, an interior permanent magnet type rotary electric machine in which the d-axis inductance and the q-axis inductance have different values produces reluctance torque based on the difference. Also, in the surface magnet rotary electric machine, small reluctance torque may be produced.

Thus, in the case where the technique of the above-described patent document is applied to a three-phase rotary electric machine that produces torque including the magnet torque and the reluctance torque, a problem arises that torque ripples of the reluctance torque cannot be cancelled.

SUMMARY

The present disclosure has been achieved in light of the above-described circumstances, and to provide a control apparatus of a three-phase rotary electric machine capable of reducing a peak value of the phase current and the torque ripples, in a field of control apparatuses of three-phase rotary electric machines that generate torque including the magnet torque and the reluctance torque.

The present disclosure provides a control apparatus for driving a three-phase rotary electric machine having two three-phase winding groups. The three-phase rotary electric machine generates torque which is a sum of magnet torque and reluctance torque when AC current having mutually different phases is flows through the two winding groups.

The control apparatus is provided with two power converters and a control unit. Each of the two power converters is provided for a corresponding one of two winding groups, each power converter supplying AC current to each of the two winding groups, the AC current supplied to the two winding groups having the same amplitude and the mutually different phases defined as $30\pm60\times n[\deg]$, where n is integer number.

The control unit is configured to calculate the d-axis current and q-axis current of a $6(2k+1)$th order component superposed on a fundamental wave component in a dq coordinate system, where k=0 or more integer number, so as to reduce a peak value of a first order component in phase current conducted in the two winding groups, thereby controlling conduction of the three-phase rotary electric machine.

The control unit is configured to calculate current such that an amplitude of the q-axis current of the $6(2k+1)$th order component is larger than an amplitude of the d-axis current of the $6(2k+1)$th order component.

It should be noted that the $6(2k+1)$th order component corresponds to 6th, 18th, and 30th order components In the three-phase rotary electric machine that generates reluctance torque, torque ripples of a $12(2k+1)$th order component are produced, based on a product of amplitudes of the d-axis current of $6(2k+1)$th order components and the q-axis current of $6(2k+1)$th order components.

To reduce the torque ripples, the product of amplitudes of the q-axis current and the d-axis current of $6(2k+1)$th order component has to be smaller. However, in the case where an amplitude of the d-axis current is set to be larger and an amplitude of the q-axis current is set to be smaller, a reduction effect on the peak phase current is small.

According to the present disclosure, an amplitude of the q-axis current of the $6(2k+1)$th order component is set to be larger than an amplitude of the d-axis current of the $6(2k+1)$th order component.

Thus, in the three-phase rotary electric machine that generates torque including magnet torque and reluctance torque, torque ripples can be reduced and peak value of the phase current can be appropriately reduced. As a result, vibration or noise due to the torque ripples can be reduced and also, heat and power loss caused by the peak value of the phase current can be reduced.

Preferably, the control unit sets the amplitude of the d-axis current of the $6(2k+1)$th order component to be 0, and conducts the q-axis current of the $6(2k+1)$th order component only. Thus, torque ripples of the $12(2k+1)$th order component can be set to 0. Thus, influence of torque ripples can be removed.

DETAILED DESCRIPTION OF THE PREFERRED EMBODIMENTS

Figure 1:
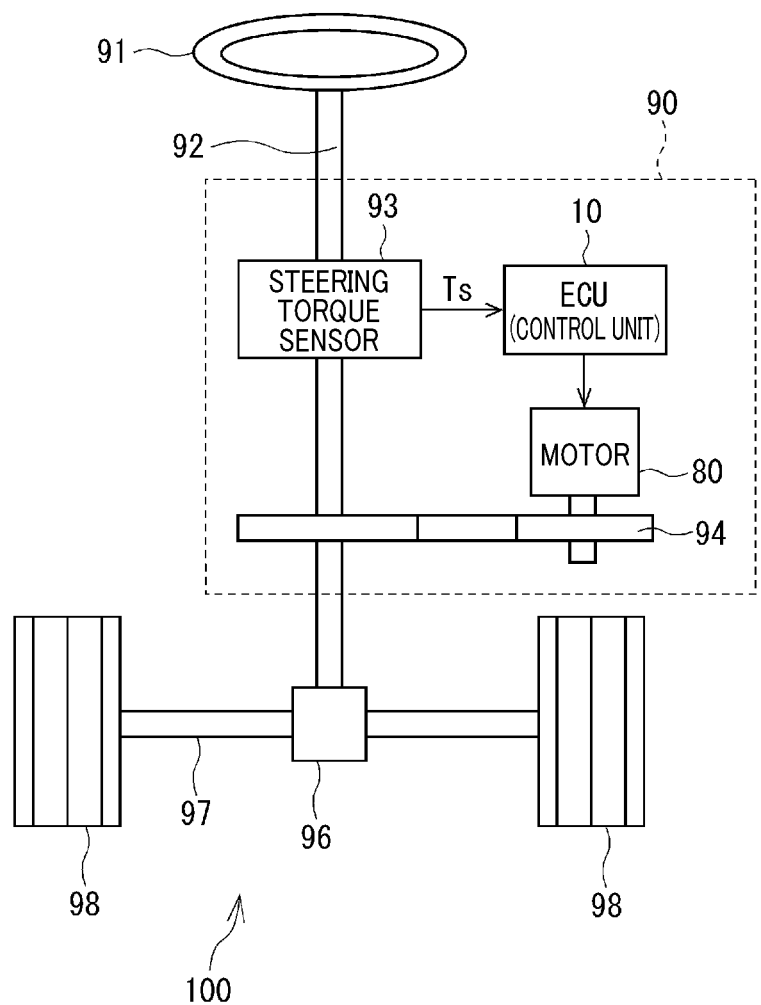
FIG. 1 is a diagram showing an overall configuration of an electric power steering apparatus to which a control apparatus of a three-phase rotary electric machine according to embodiments of the present disclosure are applied.
Figure 2:
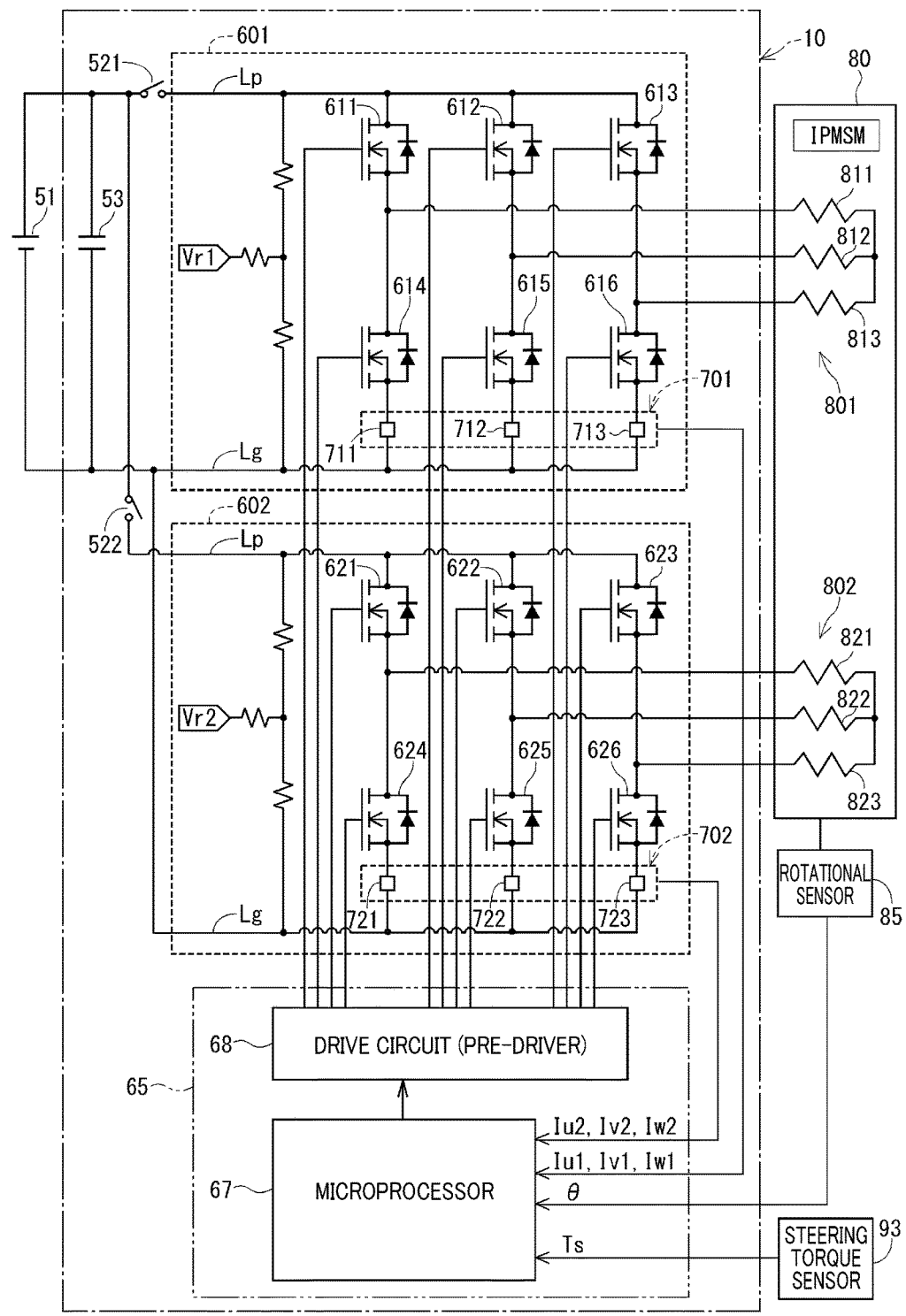
FIG. 2 is a diagram showing an overall configuration of a control apparatus of a three-phase rotary electric machine.

Hereinafter, with reference to the drawings, a plurality of embodiments of a control apparatus of a three-phase rotary electric machine will be described. In each of the embodiments, an ECU as a control apparatus of a three-phase rotary electric machine is applied to an electric power steering apparatus of a vehicle, controlling a conduction of a motor (i.e., three-phase rotary electric machine) that generates a steering assist torque. With reference to FIGS. 1 and 2, first, a common configuration through respective embodiments will be described.

[Configuration of Electric Power Steering Apparatus]

In FIG. 1, an overall configuration of a steering system 100 including an electric power steering apparatus 90 will be described. It should be noted that the electric power steering apparatus 90 shown in FIG. 1 is configured as a column assist type, but may be configured as a rack assist type as well.

The steering system 100 includes a steering wheel 91, a steering shaft 92, a pinion gear 96, a rack shaft 97, wheels 98 and the electric power steering apparatus 90.

The steering wheel 91 is connected to the steering shaft 92. The pinion gear 96 disposed at a tip end portion of the steering shaft 92 engages the rack shaft 97. At both ends of the rack shaft 97, a pair of wheels 98 is provided via a tie rod or the like. When the drive rotates the steering wheel 91, the steering shaft 92 connected to the steering wheel 91 is rotated.

A rotary movement of the steering shaft 92 is converted to a linear movement of the rack shaft 97 by the pinion gear 96, and the pair of wheels 98 is steered with an angle in response to a displacement of the rack shaft 97.

The power steering apparatus 90 includes a steering torque sensor 93, an ECU 10, a motor 80 and a reduction gear 94. The steering torque sensor 93 is provided in a portion of the steering shaft 92, detecting steering torque Ts from the driver. The ECU 10 controls a drive of the motor 80 based on the steering torque Ts such that the motor 80 generates a desired assist torque. The assist torque outputted by the motor 80 is transmitted to the steering shaft 92 via the reduction 94.

[Configuration of Control Apparatus]

In FIG. 2, an overall configuration of the control apparatus is shown. The motor 80 as a three-phase rotary electric machine is configured as a three-phase brushless motor having two three-phase winding groups 801 and 802. Each phase coil 821, 822 and 823 of the first winding group 802 are arranged to have a positional relationship i.e., electrical angle 30 degrees with respect to phase coils 811, 812, and 813 of the first winding group 801. The rotational sensor 85 detects electrical angle θ of the motor 80 and outputs the angle θ to a control unit 65.

Further, the motor 80 is configured as an interior permanent magnet type synchronous motor (i.e., IPSM). Generally, the interior permanent type rotary electric machine generates torque which is a sum of magnet torque and reluctance torque. As described above, the control apparatus according to the embodiments is configured to control a drive of the motor 80 that generates a sum of the magnet torque and the reluctance torque. The configuration shown in FIG. 2 differs from the configuration disclosed in the above-mentioned patent document, in that the motor 80 is clearly stated as IPMSM.

The ECU 10 as a control apparatus includes inverters 601 and 602, current sensors 701 and 702, and a control unit 65.

The first inverter 601 as a first power converter and the second inverter 602 as a second power converter 602 are provided corresponding to two winding groups 801 and 802, where AC (alternating current) current is supplied to each of the two winding groups 801 and 802. The AC current supplied to respective two winding groups have a phase difference (i.e., 30±60×n) between two winding groups, where n is an integer number. Also, the AC current supplied to respective two winding groups have the same amplitude between two winding groups.

Hereinafter, a 'system' is defined as a unit including a winding group and an inverter corresponding to the winding group. In the reference numbers of elements, a third digit, i.e., 1 or 2 represents a system number. Similarly, in symbols representing physical quantity such as current or voltage, the last digit such as 1 or 2 represents the system number. In the case where a physical quantity for two systems has to be referred to, the last digit, 1 or 2 is not applied thereto.

For the inverters 601 and 602, each inverter has a configuration in which 6 switching elements (i.e., 611 to 616, 621 to 626) are connected between the high potential line Lp and the low potential line Lg to form a bridge connection. The inverters 601 and 602 are each controlled by the control unit 65 such that a drive signal of a drive circuit 68 is outputted to the inverters 601 and 602 to perform a switching operation, whereby DC (direct current) power of a battery 51 is converted to AC power supplied to the winding groups 801 and 802.

The input section of each inverter 601 and 602 has a power relay 521, 522 and a smoothing capacitor 53 corresponding to respective systems. The input voltage thereof can be detected by detecting divided voltages Vr1 and Vr2.

The current sensors 701 and 702 are configured of current detectors 711, 712, and 713, and current detectors 721, 722 and 723 respectively, detect phase current corresponding to each system, the phase current including Iu1, Iv1, Iw1 and Iu2, Iv2, Iw2 and transmit the detected phase current to the control unit 65 as feedback information. The control unit 65 is configured of a microprocessor 67, a drive circuit (or pre-driver) 68 or the like, and controls the conduction of the motor 80, based on feedback information including the steering torque Ts detected by the steering torque sensor 93, the phase current Iu1, Iv1, Iw1, Iu2, Iv2 and Iw2, and electrical angle $\theta$.

Next, configurations of the control unit 65 according to respective embodiments will be described for each embodiment. As reference numbers applied to the control unit of first to fourth embodiments, the third digit following 65 will be the embodiment number. Each of the control units 651 to 654 corresponding to the first to forth embodiments performs a feedback control in which sum and subtraction of dq-axis actual current flowing through the winding groups 801 and 802 is feedbacked to the sum and subtraction of dq-axis current commands between the two systems. According to this method, compared to a configuration of the feedback performed for each system, calculation can be simplified. In the embodiments, the same reference numbers are applied to substantially the same elements.

First Embodiment

With reference to FIGS. 3 to 12, the first embodiment will be described as follows.

Figure 3:
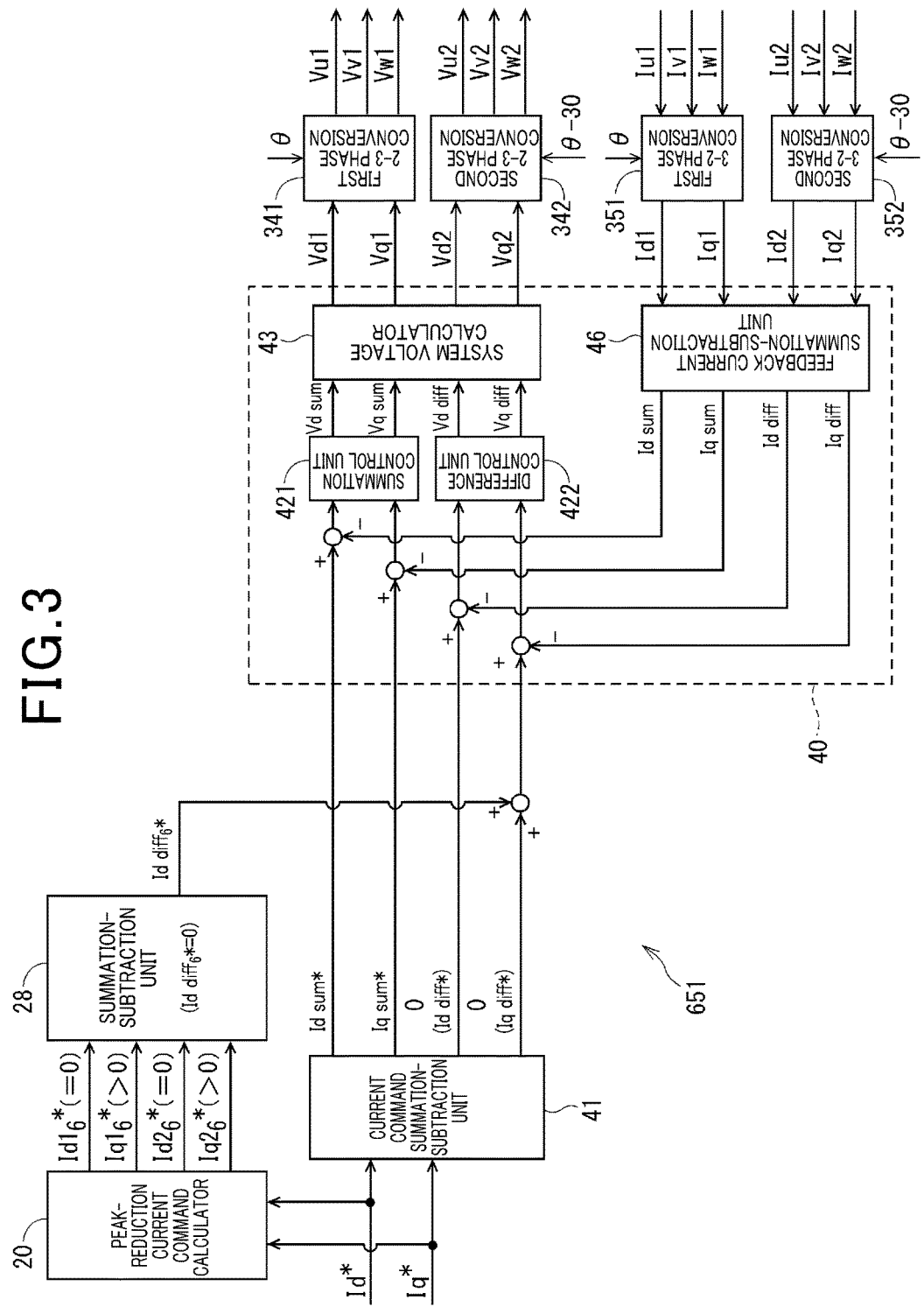
FIG. 3 is a block diagram showing a control unit according to a first embodiment.

As shown in FIG. 3, the control unit 651 includes a current command summation-subtraction unit 41, a peak-reduction current command calculator 20, a summation-subtraction unit 28 and a current feedback calculator 40.

In the current command summation-subtraction unit 41, current command value Id*, Iq* for each d-axis and q-axis are calculated so as to generate summation of the current command values, that is, Id sum* and Iq sum*, and difference between the current command values, that is, Id diff* and Iq diff*. Since electrical characteristics between the two systems are equivalent to each other, Id sum*, Iq sum* correspond to doubled values of Id* and Iq*, and Id diff* and Iq diff* correspond to 0. It should be noted that no current command summation-subtraction unit 41 may optionally be provided, instead, a configuration setting "Id sum*=2×Id*, Iq sum=2×Iq*, Id diff*=0, Iq diff=0" may be used.

The peak-reduction current command calculator 20 calculates harmonic components being superposed on the phase current in the dq coordinate system so as to reduce peak of the first order component of the phase current which flows through the winding groups 801 and 802, that is, peak of the fundamental wave. According to the first to fourth embodiments, as a harmonic component, 5th and 7th order components are generated, where the 5th order component has a frequency which is 5 times of the first order component of the phase current, and the 7th order component has a frequency which is 7 times of the first order component of the phase current. Further, as harmonic components being superposed on the fundamental waves of 0 order components in the dq coordinate, dq-axis current of 6th order component having frequency which is 6 times of the first order component of the phase current is generated.

The detailed configuration of the peak-reduction current command calculator 20 will be described later.

The 6th order dq-axis current described in the present specification refers to a current command value superposed on the fundamental waves in order to reduce peak of the phase current. The amplitude of the 6th order d-axis current relative to the amplitude of the fundamental waves in the first and second systems are referred to as $Id1_6^*$, $Id2_6^*$, and difference between two systems is referred to as Id $diff_6^*$.

Similarly, the amplitude of the 6th order d-axis current relative to the amplitude of the fundamental waves in the first and second systems is referred to as $Iq1_6^*$, $Iq2_6^*$, and the difference between the two systems is referred to as Iq $diff_6^*$.

The 6th order dq-axis current $Id1_6^*$, $Id2_6^*$, $Iq1_6^*$ and $Iq2_6^*$ calculated for each system by the peak-reduction current command calculator 20 are calculated in the summation-subtraction unit 28 to perform a summation or a subtraction for each of the d-axis and q-axis. Since the 6th order components between two systems, which have 30 degrees shifted current phases, are cancelled by a summation therebetween, each of Id $sum_6^*$ and Iq $sum_6^*$ becomes 0.

Especially, according to the first embodiment, the amplitudes of the 6th order q-axis current $Iq1_6^*$ and $Iq2_6^*$ are defined as positive value, and the amplitudes of the 6th order d-axis current $Id1_6^*$ and $Id2_6^*$ are defined as 0. The technical features thereof will be described later.

The amplitudes of the 6th order q-axis current $Iq1_6^*$ and $Iq2_6^*$ which are positive values are larger than the amplitudes of the 6th order d-axis current $Id1_6^*$ and $Id2_6^*$, that is, apparently larger than 0. Also, since Id $diff_6^*$ which is a difference of the 6th order d-axis current between two systems is 0, only Iq $diff_6^*$ which is a difference of the 6th order q-axis current between two systems is outputted from the summation-subtraction unit 28.

It should be noted that a configuration may be employed in which Iq $diff_6$ is directly calculated in the peak-reduction current command calculator 20 without providing the summation-subtraction unit 28.

The value Iq $diff_6^*$ calculated by the summation-subtraction unit 28 is added to Iq diff* which is a difference of the q-axis current command value between two systems, calculated by the current command summation-subtraction unit 41. In other words, the value Iq $diff_6^*$ is added to 0. Thus, Id sum*, Iq sum* and Id diff* calculated by the current command summation-subtraction unit 41 are directly outputted to the current feedback calculator 40. The value Iq $diff_6^*$ is added to Iq diff*, and the Iq diff* is outputted to the current feedback calculator 40.

The current feedback calculator 40 includes a summation control unit 421, a difference control unit 422, a system voltage calculator 43 and a feedback current summation-subtraction unit 46. It should be noted that "a portion performing a feedback control based on deviation between the command value and the actual value" is defined as "current feedback calculator". Accordingly, coordinate conversion units 341, 342, 351 and 352 are shown outside the current feedback calculator.

The summation control unit 421 receives deviations between Id sum*, Iq sum* and Id sum, Iq sum calculated by the feedback current summation-subtraction unit 46. The summation control unit 421 calculates, by a proportional-integral control calculation, Vd sum and Vq sum which are voltage command values for two systems so as to converge the deviations.

The difference controlling unit 422 receives Id diff* (=0), a value where Iq diff$_6$* is added to Iq diff*(=0), deviations from Id diff and Iq diff calculated by the feedback current summation-subtraction unit 46. The difference controlling unit 422 calculates, by the proportional-integral control calculation, Vd diff and Vq diff which are the differences of the voltage command values between two systems so as to converge the deviations to be 0.

For the coordinate conversion units 341, 342, 351 and 352 shown in FIG. 3, suffix "first" is applied to the conversion unit for the first system, and "second" is applied to the conversion unit for the second system. However, since functions of respective control blocks between two systems are the same, suffix "first" and "second" are appropriately omitted. In the coordinate conversion calculation, as an electrical angle, θ is used for the first system, and θ-30 is used for the second system, where phase is shifted by 30 degrees for the second system. Hereinafter, the unit of θ is defined as [deg] through the entire specification.

The system voltage calculator 43 converts Vd sum, Vq sum, Vd diff and Vq diff to the voltage command values for the first and second systems, i.e., Vd1, Vq1, Vd2, and Vq2 and output them to a 2 to 3 phase conversion units 341 and 342.

The 2 to 3 phase conversion units 341 and 342 performs a coordinate-conversion of the dq-axis voltage command values Vd1, Vq1, Vd2 and Vq2 into three phase voltage command values Vu1, Vv1, Vw1, Vu2, Vv2 and Vw2.

Then, a PWM control or the like is performed based on the three phase voltage command values Vu1, Vv1, Vw1, Vu2, Vv2 and Vw2, so as to generate drive signals for the inverters 601 and 602.

3 to 2 phase conversion units 351 and 352 perform a coordinate-conversion of the actual current Iu1, Iv1, Iw1, Iu2, Iv2 and Iw2 which are detected by the current sensor into the dq-axis current Id1, Iq1, Id2 and Iq2, thereby performing a feedback control.

The feedback current summation-subtraction unit 46 performs summation and subtraction for the current detection values Id1, Iq1, Id2 and Iq2 transmitted by the 3 to 2 phase conversion units 351 and 352 so as to calculate the Id sum, Iq sum, Id diff and Iq diff.

Subsequently, with reference to FIGS. 4 to 8, a configuration of the peak-reduction current command calculator 20 will be described, which are commonly used for each embodiment.

Figure 4:
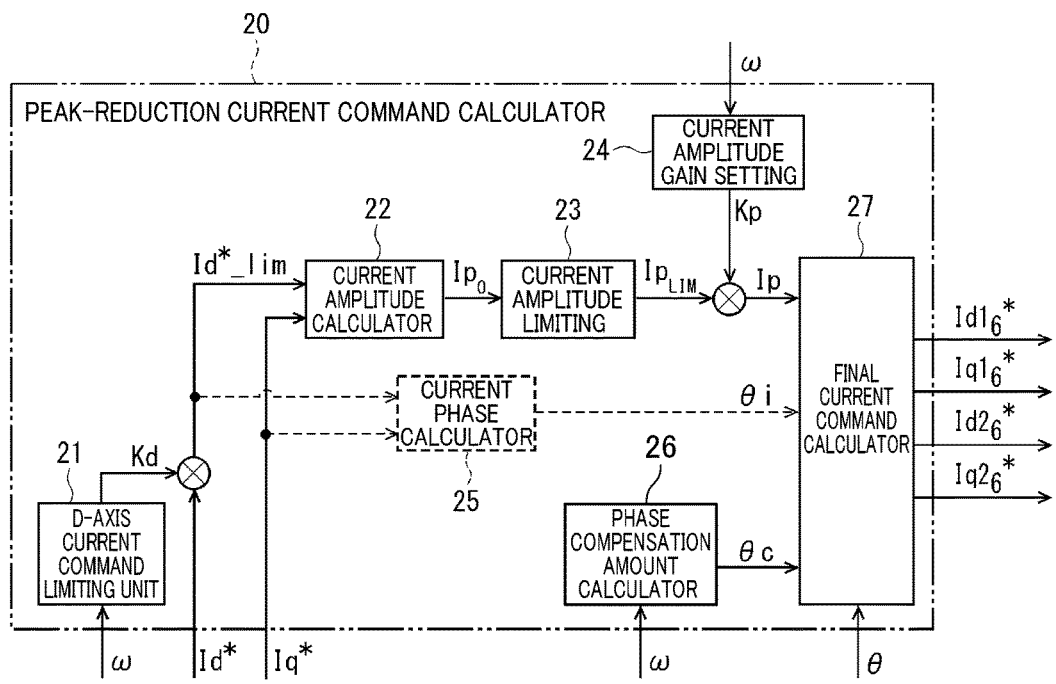
FIG. 4 is a block diagram showing a peak-reduction current command calculator shown in FIG. 3.

As shown in FIG. 4, the peak-reduction current command calculator 20 is provided with a d-axis current command limiting unit 21, a current amplitude calculator 22, a current amplitude limiting unit 23, a current amplitude gain setting unit 24, a current phase calculator 25, a phase compensation amount calculator 26 and a final current command calculator 27. The peak-reduction current command calculator 20 calculates 6th dq-axis current Id1$_6$*, Id2$_6$*, Iq1$_6$* and Iq2$_6$* as the peak-reduction current command, based on the dq-axis current command values Id* and Iq*. According to the first embodiment, the amplitudes of the 6th d-axis current Id1$_6$* and Id2$_6$* are 0.

The peak of the phase current is reduced so that heat produced at the inverters 601 and 602 or the winding groups 801 and 802 can be reduced especially when the motor 80 is at 0 speed or at a low rotational rate.

The peak-reduction current command calculator 20 accepts an electrical angle θ detected by the rotational angle sensor 85 and an angular velocity ω obtained by differentiating the electrical angle θ with time, in addition to the dq-axis current command Id* and Iq*. The electrical angular velocity θ is converted to a motor rotational rate [rpm] by multiplying proportionality constant. In the following description and the drawings, "rotational rate obtained by converting the electrical angular velocity ω" is appropriately abbreviated to "rotational rate ω". Also, positive or negative direction of the rotational rotate ω is defined based on the positive or negative direction of the electrical angle θ, that is, the rotational direction of the motor 80.

The peak-reduction current command calculator 20 calculates 6th order dq-axis current in the dq coordinate so as to reduce peak of the first order component of the phase current. Hereinafter, calculations by respective control blocks will be described. Each calculation may be executed by referring to a map or by using equations.

Figure 5:
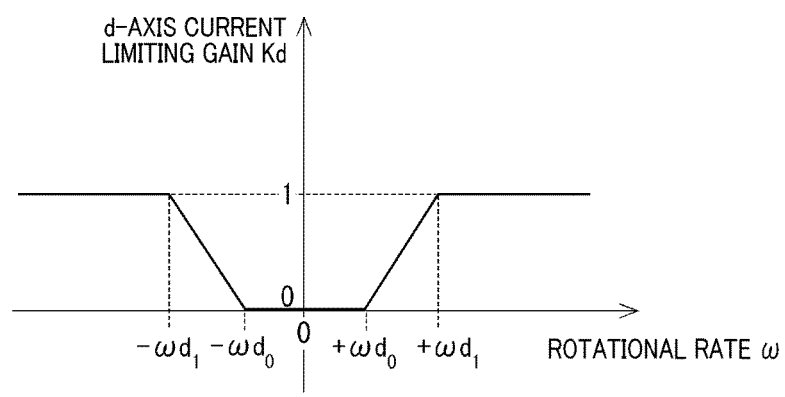
FIG. 5 is a graph showing a relationship between a rotational rate of a three-phase rotary electric machine and a d-axis current limiting gain.

The d-axis current command limiting unit 21 limits the d-axis current command value Id* based on the rotational rate ω of the motor 80, and outputs as the d-axis current command limited value Id*_lim. Specifically, as shown in FIG. 5, when the absolute value of the rotational rate ω is larger than or equal to ωd$_1$, the d-axis current command value Id* is multiplied by 1 as a d-axis current limit gain Kd. When the absolute value of the rotational rate ω is less than ωd$_0$, the d-axis current command value Id* is multiplied by 0 as the d-axis current limit gain Kd. Also, when the absolute value of the rotational rate ω is in a range from ωd$_0$ to ωd$_1$, the gain Kd is gradually increased from 0 to 1.

When the absolute value of the rotational rate ω is larger than or equal to ωd$_1$, the d-axis current command value Id* is maintained, and when the absolute value of the rotational rate ω is less than ωd$_0$, the d-axis current command value Id* is set to 0 to fix the current phase θi to be 0 degree. Also, when the absolute value of the rotational rate ω is in a range from ωd$_0$ to ωd$_1$, the d-axis current command value Id* is gradually changed. Thus, in a low rotational rate region where the absolute value of the rotational rate ω is less ωd$_0$, calculation of the dq-axis current phase θi can be omitted.

The current phase θi corresponds to an angle relative to +q axis of current vector where the Id* and Iq* in the dq-axis coordinate are defined as d-axis and q-axis components respectively. The current phase θi is defined such that anti-clock wise direction relative to +q axis is a positive direction.

The current amplitude calculator 22 calculates current amplitude reference value Ip$_0$ of 6th order component of the dq-axis current.

Figure 6:
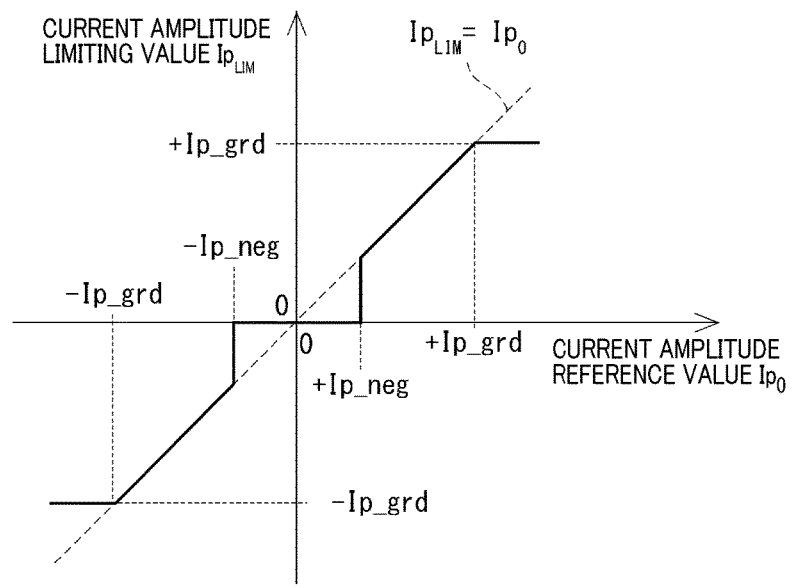
FIG. 6 is a graph showing a relationship between a current amplitude reference value and a current amplitude limiting value.

The current amplitude limiting unit 23 limits value of the current amplitude reference value Ip$_0$ and outputs the value as the current amplitude limit value IP$_{LIM}$. Specifically, as shown in FIG. 6, when the absolute value of the current amplitude reference value Ip$_0$ is larger than or equal to Ip_neg and smaller than or equal to Ip_grd, the current amplitude reference value Ip$_0$ is maintained. On the other hand, when the absolute value of the current amplitude reference value Ip$_0$ is less than Ip_neg, the current amplitude limit value IP$_{LIM}$ is set to 0. Moreover, when the absolute value of the current amplitude reference value $Ip_0$ exceeds Ip_grd, the current amplitude limit value $IP_{LIM}$ is limited to a guard value±Ip_grd.

When the absolute value of the current amplitude reference value $Ip_0$ is smaller than Ip_neg, since the peak of the first order component of the phase current is relatively low, thus producing less heat, it is not necessary to reduce the peak.

Hence, setting the current amplitude limit value $IP_{LIM}$ to be 0 and the peak-reduction current command value outputted by the peak-reduction current command calculator 20 to be 0, the calculation of the peak-reduction current command value can be omitted.

The current amplitude gain setting unit 24 sets the current amplitude gain Kp based on the rotational rate ω of the motor 80. The current amplitude Ip is outputted to the final current command calculator 27, in which the current amplitude Ip is obtained by multiplying the current amplitude limit value $Ip_{LIM}$ outputted by the current amplitude limiting unit 23 by the current amplitude gain Kp.

Figure 7A:
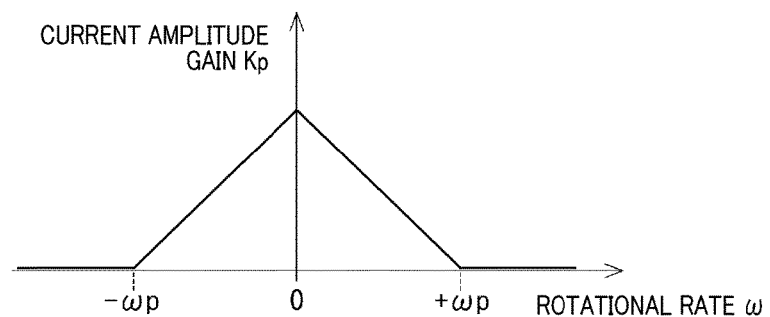
FIG. 7A is a graph showing a relationship between a rotational rate of the three-phase rotary electric machine and a current amplitude gain.
Figure 7B:
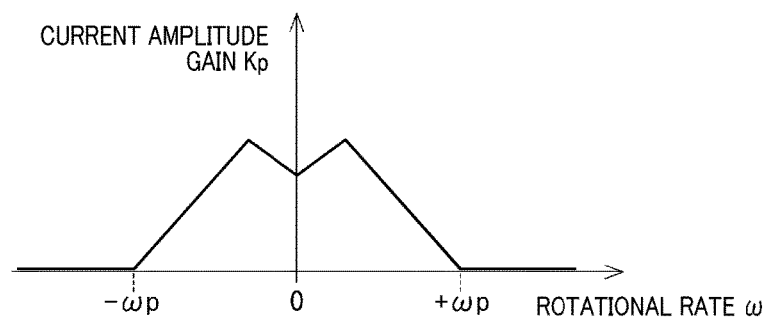
FIG. 7B is a graph showing a relationship between a rotational rate of the three-phase rotary electric machine and a current amplitude gain.

As shown in FIGS. 7A and 7B, when the absolute value of the rotational rate ω is larger than ωp, the current amplitude gain Kp is set to 0. In other words, in a high rotational rate region where the absolute value of the rotational rate ω is larger than ωp, the peak-reduction current command value is set to 0, and the peak of the first order component of the phase current is not reduced. Therefore, assuming a relationship between a rotational rate threshold ωp of the current amplitude gain setting unit 24 and a rotational rate threshold $ωd_0$ of the d-axis current command limiting unit 21 to be $ωd_0 \geq ωp$, the calculation of the current phase θi can be omitted in all rotational rate regions.

On the other hand, when the absolute value of the rotational rate ω is less than or equal to ωp, in an example shown in FIG. 7A, the current amplitude gain Kp is set such that when the rotational rate ω approaches 0, the current amplitude Kp is linearly increased. In an example shown in FIG. 7B, the current amplitude gain Kp is set so as to compensate an amount of decreased amplitude due to a response delay in the current control. For example, the current amplitude gain Kp increases as the absolute value of the rotational rate decreases from ωp and decreases when the absolute value of the rotational rate ω is around 0.

According to this configuration, harmonic components are superposed on the current when it is in zero to low speed rotational rate, where produced heat is likely to influence the peak value, and no harmonic components is superposed on the current when rotating with a high rotational rate, where effective value is likely to influence a heat-production.

Thus, effective control can be performed depending on various requirements.

In the case where a relationship between the rotational rate threshold ωp of the current amplitude gain setting unit 24 and the rotational rate threshold $ωd_0$ of the d-axis current command limiting unit 21 is $ωd_0 < ωp$, the current phase calculator 25 calculates, based on the dq-axis current command value Id* and Iq*, the dq-axis current phase θi in a region defined as $ωd_0 < |ω| < ωp$ of the absolute value of the rotational rate ω, and outputs the dq-axis current phase θi to the final current command calculator 27.

Figure 8:
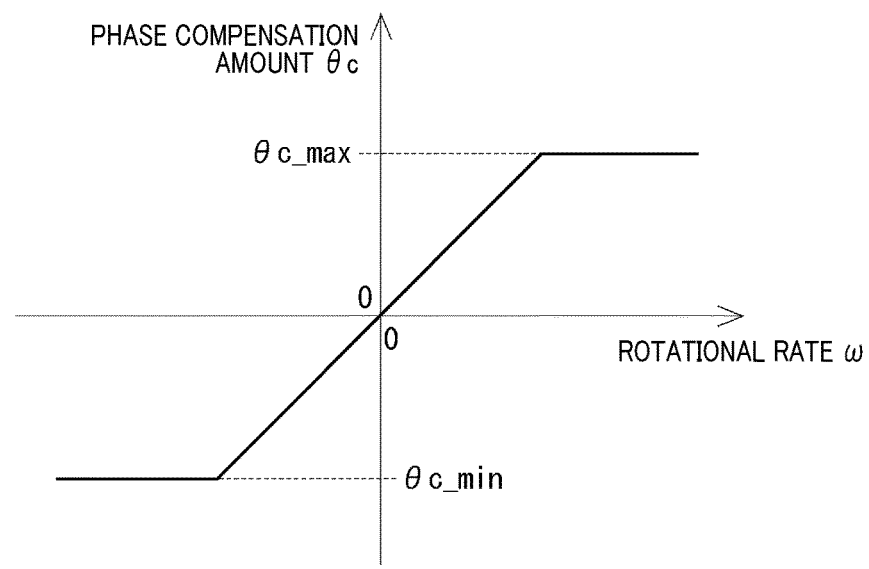
FIG. 8 is a graph showing a relationship between a rotational rate of the three-phase rotary electric machine and a phase compensation amount.

The phase compensation amount calculator 26 calculates a phase compensation amount Oc being set depending on the rotational rate ω of the motor 80. The higher the rotational rate ω, the higher the frequency of the current to be supplied, so that an amount of phase delay due to a response delay of the current control have to be compensated. Hence, as shown in FIG. 8, the phase compensation amount calculator 26 calculates a phase compensation amount θc having positive correlation with the rotational rate ω in a range from lower limit value θc_min to upper limit value θc_max, and outputs the phase compensation amount θc to the final current command calculator 27.

The final current command calculator 27 accepts the current amplitude Ip, the phase compensation θc, and the dq-axis current phase θi optionally. Also, the final current command calculator 27 acquires an electrical angle θ from the rotational sensor 85, and calculates 6th order dq-axis current $Id1_6^*$, $Id2_6^*$, $Iq1_6^*$ and $Iq2_6^*$.

With a configuration having no summation-subtraction unit 28, the final current command calculator 27 calculates the Id $diff_6^*$, Iq $diff_6^*$ which are the difference of the 6th order dq-axis current between two systems.

According to the first embodiment as configured above, as the 6th order dq-axis current for the phase current peak reduction, only the 6th order q-axis current $Iq1_6^*$ and $Iq2_6^*$ flow through the winding groups 801 and 802, and the 6th order d-axis current $Id1_6^*$ and $Id2_6^*$ do not flow therethrough. Next, technical advantages according to the above-described configuration will be described.

Here, torque Tm generated by the motor is expressed by equation (1), the torque being composed of sum of the magnet torque and the reluctance torque.

$$Tm = Kt \times Iq + (Ld-Lq) \times Id \times Iq \quad (1)$$

where Kt represents magnet torque constant, Ld and Lq represent d-axis inductance and q-axis inductance.

Generally, since an interior permanent magnet type rotary electric machine has characteristics $Ld \neq Lq$, reluctance torque is produced in accordance with the second term in the right side of the equation (1)

For the current being conducted through the two system's winding groups 801 and 802 provided with a positional relationship having electrical angles shifted from each other by 30 degrees, a configuration is employed, where 6th order dq-axis current is superposed on 0 order fundamental waves in the dq coordinate. When it is assumed that the two systems are in a normal condition, the amplitudes of the AC current outputted by the inverters 601 and 602 of two systems are the same, and the phase difference between two systems is 30 degrees.

In this configuration, winding torque Tm1 of the first system, and winding torque Tm2 of the second system are expressed by the following equations (2.1) and (2.2). For example, $Iq1_0$ refers to 0th order q-axis current amplitude in the first system, and $Iq2_6$ refers to 6th order q-axis current amplitude in the second system.

$$Tm1 = Kt \times (Iq1_0 + Iq1_6 \sin(6\theta)) + (Ld-Lq) \times (Id1_0 - Id1_6 \cos(6\theta)) \times (Iq1_0 + Iq1_6 \sin(6\theta)) \quad (2.1)$$

$$Tm2 = Kt \times (Iq2_0 + Iq2_6 \sin(6\theta)) + (Ld-Lq) \times (Id2_0 - Id2_6 \cos(6\theta)) \times (Iq2_0 + Iq2_6 \sin(6\theta)) \quad (2.2)$$

The electrical characteristics of the two systems are the same. Hence, with the following equations (3.1) to (3.4), 0 order dq-axis current $Id_0$, $Iq_0$ and 6th order dq-axis current $Id_6$, $Iq_6$ are defined which are common for the two systems.

$$Id_0 = Id1_0 = Id2_0 \quad (3.1)$$

$$Iq_0 = Iq1_0 = Iq2_0 \quad (3.2)$$

$$Id_6 = Id1_6 = Id2_6 \quad (3.3)$$

$$Iq_6 = Iq1_6 = Iq2_6 \quad (3.4)$$

When both sides in the equations (2.1) and (2.2) are summed by using the equations (3.1) to (3.4), the total winding torque Tm of the two systems is represented by the equation (4).

$$Tm = Tm1 + Tm2 \qquad (4)$$
$$= 2Kt \times Iq_0 + (Ld - Lq) \times$$
$$(2Id_0 Iq_0 - 2 \times Id_6 \cos(6\theta) \times Iq_6 \sin(6\theta))$$
$$= 2Kt \times Iq_0 + (Ld - Lq) \times (2Id_0 Iq_0 - Id_6 Iq_6 \sin(12\theta))$$

Specifically, in the second term of the right side of the equation (4), the 6th order torque ripple can be cancelled for the two systems, but the 12th order torque ripple cannot be cancelled.

Therefore, when either one of amplitudes of 6th order d-axis current $Id_6$ or 6th order q-axis current $Iq_6$ is set to 0, the 12th order torque ripple including these products becomes 0. However, in the case where the amplitude of the 6th order current $Iq_6$ is set to 0 and only the 6th order d-axis current $Id_6$, flows it has been found through a verification that a peak reduction effect of the phase current cannot be obtained. Accordingly, in the first embodiment, a configuration is employed, where the amplitude of the 6th order d-axis current $Id_6$ is set to 0 and only the 6th order q-axis current $Iq_6$ flows.

In this case, when substituting $Id_6=0$ for the equation (4), the following equation (5) is obtained. Specifically, the reluctance torque is only defined by 0 order dq-axis current $Id_0$ and $Iq_0$ which are DC (direct current) component, and 12th order torque ripple is not produced.

$$Tm = Tm1 + Tm2 \qquad (5)$$
$$= 2Kt \times Iq_0 + (Ld - Lq) \times (2Id_0 Iq_0 - 0 \times Iq_6 \sin(12\theta))$$
$$= 2Kt \times Iq_0 + 2(Ld - Lq) \times Id_0 Iq_0$$

Subsequently, the peak reduction effect of the phase current according to the first embodiment will be described with reference to FIGS. 9 to 12.

Figure 9:
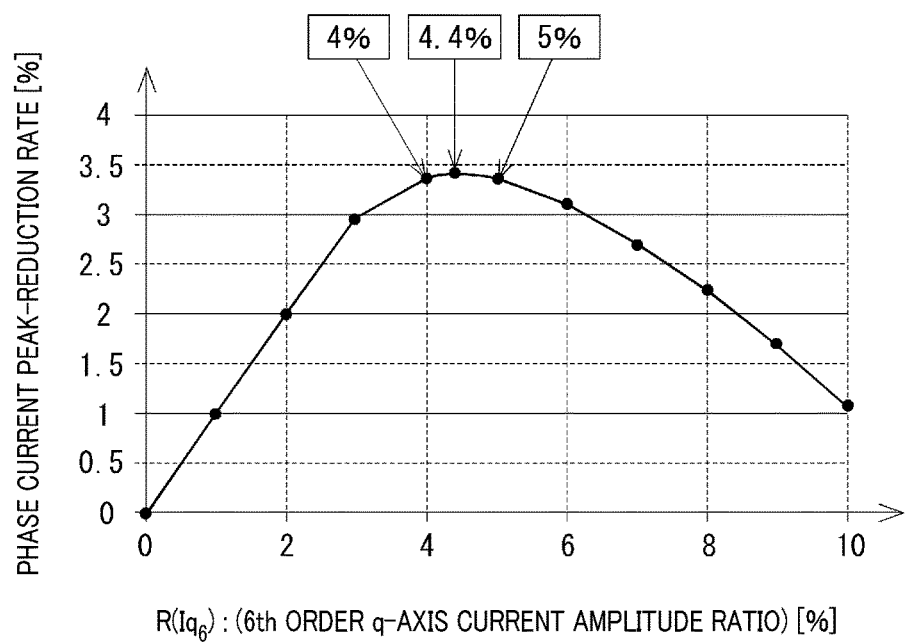
FIG. 9 is a graph showing a relationship between a 6th order q-axis current ratio and a phase-current peak reduction ratio.

Hereinafter, the amplitude ratios for 6th order d-axis current $Id_6$ and 6th order q-axis current $Iq_6$ with respect to the fundamental amplitude are referred to as 6th order d-axis amplitude ratio $R(Id_6)$ and 6th order q-axis amplitude ratio $R(Iq_6)$ respectively. FIG. 9 shows a change in the phase-current peak reduction ratio when the 6th order q-axis current amplitude ratio R ($Iq_6$) is changed from 0% to 10%. The phase current waveform corresponding to the 6th order q-axis current amplitude ratio $R(Iq_6)$ around the maximum phase peak reduction ratio (shown in FIG. 9), that is, 4%, 4.4% and 5%, are shown in FIGS. 10, 11 and 12 respectively.

FIGS. 10A, 10B, 11A, 11B, 12A and 12B show phase current waveform for one electrical period. Respective three-phase waveforms in the same system have the same waveform-shape, where phases are shifted by 120 degrees from each other. Also, waveforms between two systems corresponding any one of three phases are shift by 30 degrees from each other. The waveforms in FIGS. 10A, 10B, 11A, 11B, 12A and 12B can be at any system and any phase in the three phases, and a position labeled by 0 degree in the phase axis has no particular meaning. In FIGS. 10A, 10B, 11A, 11B, 12A and 12B, the fundamental wave of the phase current is expressed by sin $(\theta+165)$.

In other words, a positive peak and a negative peak in the fundamental wave appear at the phase $\theta=-75$ and 105.

Figure 10A:
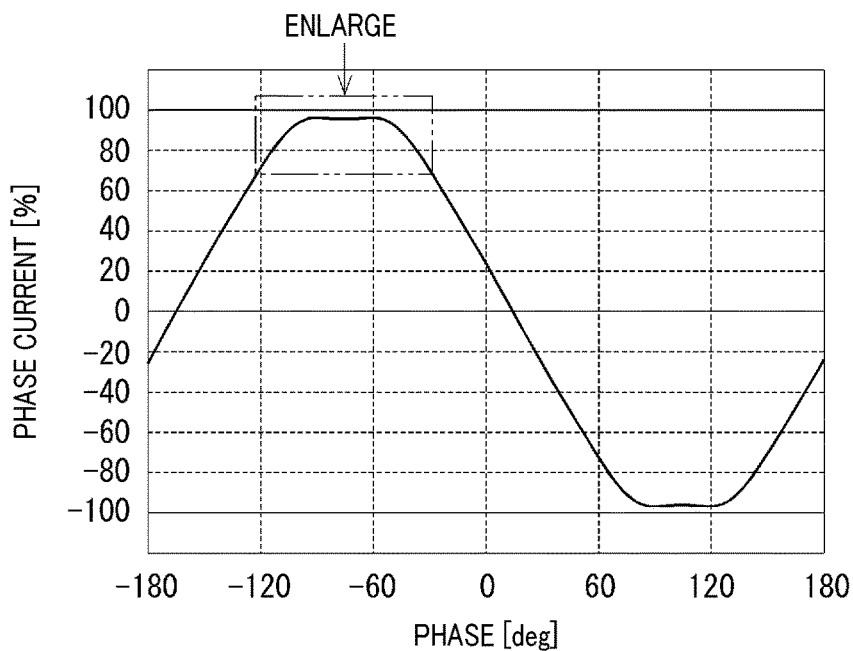
FIG. 10A is a graph showing a phase current waveform with 4% of 6th order q-axis current ratio.
Figure 10B:
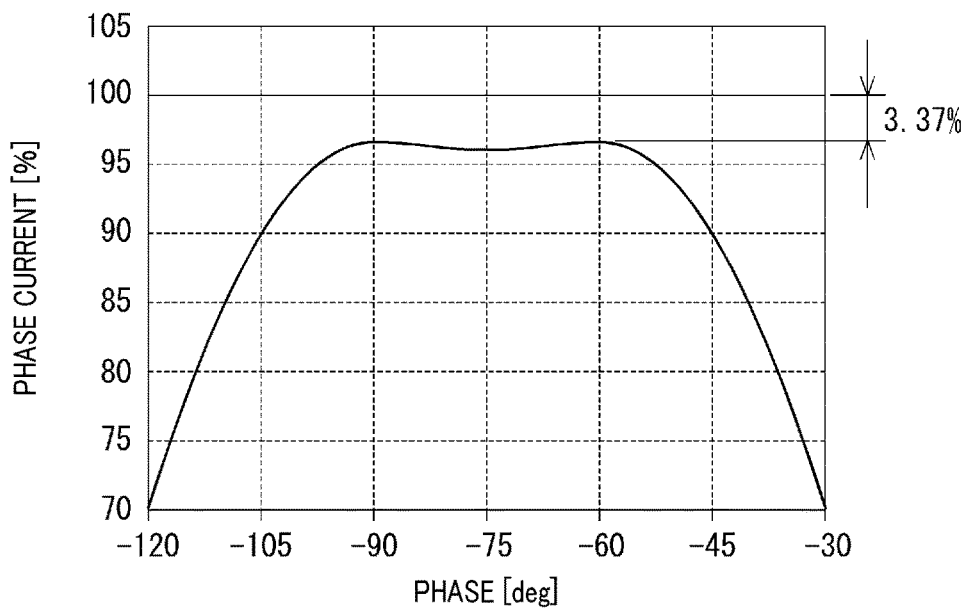
FIG. 10B is a graph showing an enlarged view of a peak portion of the phase current waveform shown in FIG. 10A.
Figure 11A:
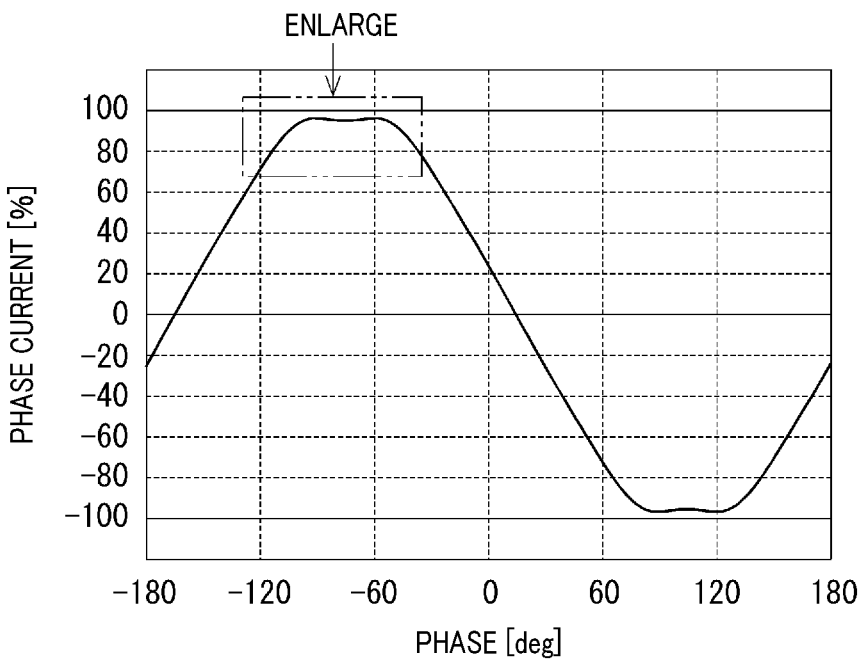
FIG. 11A is a graph showing a phase current waveform with 4.4% of 6th order q-axis current ratio.
Figure 11B:
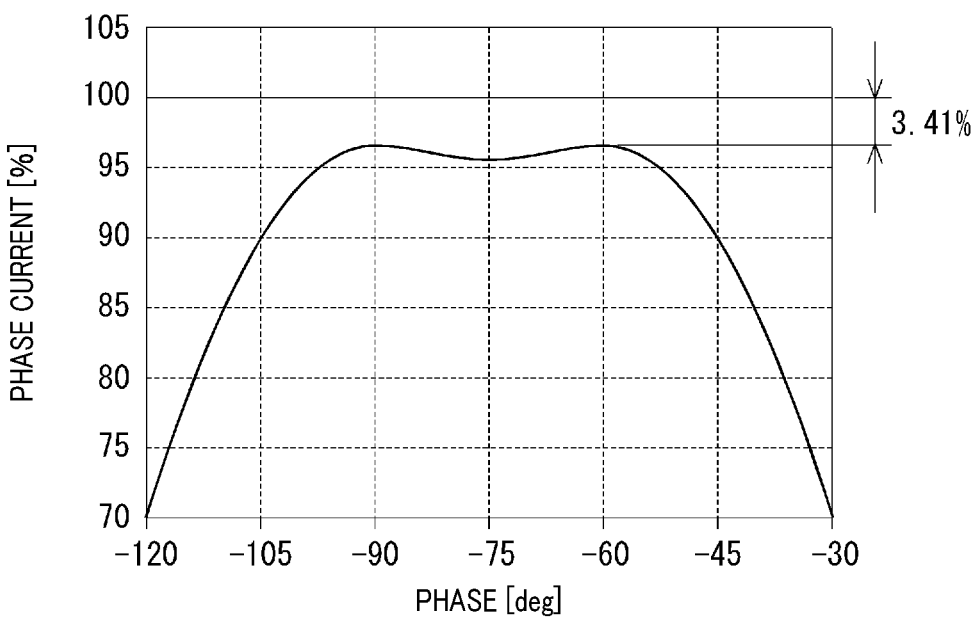
FIG. 11B is a graph showing an enlarged view of a peak portion of the phase current waveform shown in FIG. 11A.
Figure 12A:
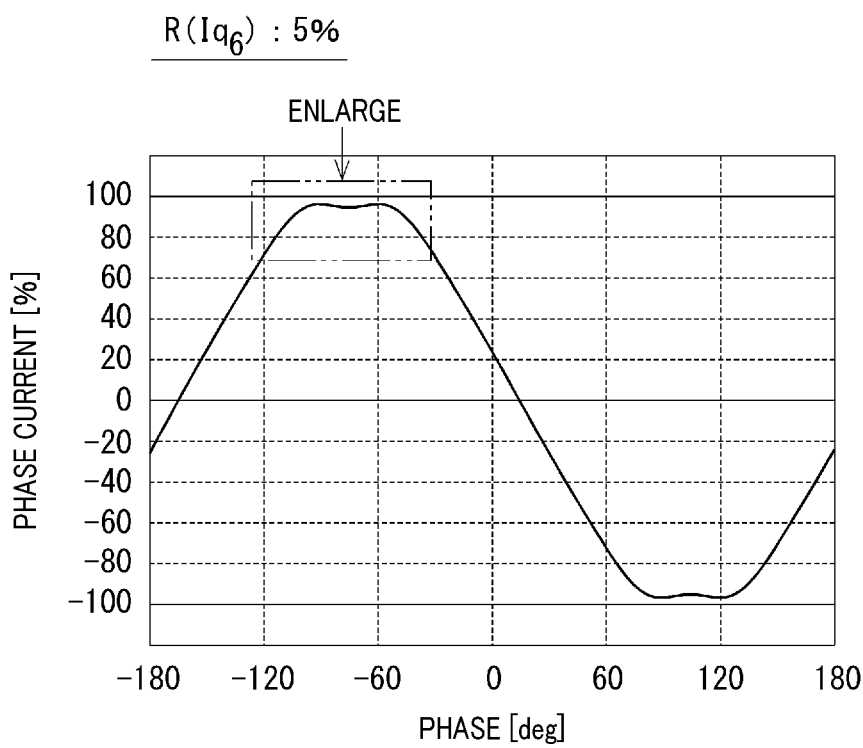
FIG. 12A is a graph showing a phase current waveform with 5% of 6th order q-axis current ratio.
Figure 12B:
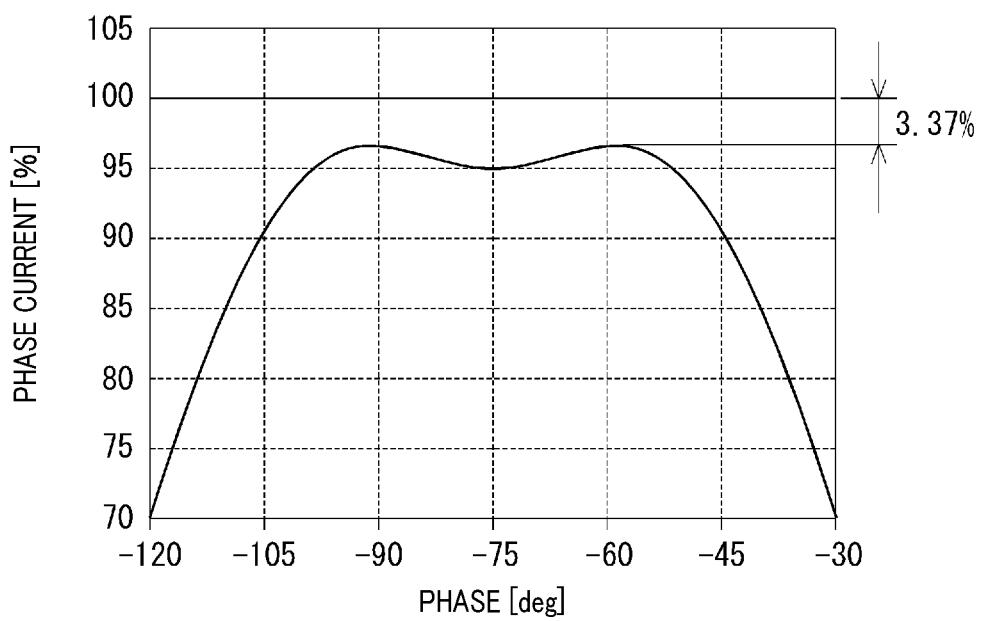
FIG. 12B is a graph showing an enlarged view of a peak portion of the phase current waveform shown in FIG. 11A.

In each of FIGS. 10B, 11B and 12B, a position around the positive peak of the phase current shown in each of FIGS. 10A, 11A and 12A is enlarged with respect to the phase $\theta=-75$ degrees as a center phase. As shown in the FIGS. 10B, 11B and 12B, in the phase current waveform where the 6th order q-axis current $Iq_6$ is superposed, the current value at the center phase sinks compared to current values of the both sides, and has peak values at both sides of the center phase. Here, a phase current peak reduction rate is defined as a difference between the peak value and the 100% phase current. The phase-current peak reduction ratio is about 3.4% when the 6th order q-axis current amplitude ratio R ($Iq_6$) ranges from 4% to 5%.

According to the technique disclosed by the above-mentioned patent document (i.e., Japanese Patent No. 5672278), 5th order harmonic is superposed on the fundamental wave of the first order phase current, thereby reducing the phase current peak value. At this time, current having 30 degrees shifted phases flow through the winding groups of the two systems, thereby canceling the 6th order torque ripples. However, according to this patent document, there is no mention of 12th order reluctance torque which has not been cancelled. Accordingly, the technique disclosed by the above-mentioned patent document is effective for a surface magnet type rotary electric machine. However, according to the above-mentioned patent document, when applied to a rotary electric machine that generates torque composed of the magnet torque and the reluctance torque, some of torque ripples cannot be cancelled.

However, according to the present disclosure, the control unit 651 of the first embodiment is configured such that the amplitude of the 6th order d-axis current $Id_6$ is set to 0 for the peak reduction current superposed on the fundamental wave of the dq-axis coordinate, so as to allow only the 6th order q-axis current $Iq_6$ to flow. Thus, in the motor 80 that generates torque having sum of the magnet torque and the reluctance torque, the phase current peak value can be reduced, avoiding torque ripples of the reluctance torque. Therefore, effects of reducing heat and power loss due to the phase current peak value can be obtained, and further, influence of noise or vibration due to the torque ripples can be avoided.

In particular, according to electric power steering apparatus of vehicles, because of a limited space of mounting, a small-sized ECU 10 is required to supply a large amount of current. Hence, a reduction of heat and power loss by reducing the phase current peak is strongly required. On the other hand, since noise or vibration due to torque ripples significantly influence the perception of the driver who operates a steering wheel and also influences the productivity thereof, reduction of the torque ripples is very desirable.

Therefore, according to the present disclosure, both of an effect of reducing the torque ripples and a peak reduction effect of the phase current can be achieved by respective embodiments effectively. Further, according to the first embodiment, since the 12th torque ripples can be 0, the configuration of the present disclosure can be suitably adapted to a system in which a reduction of noise and vibration is very desirable.

Second Embodiment

Figure 13:
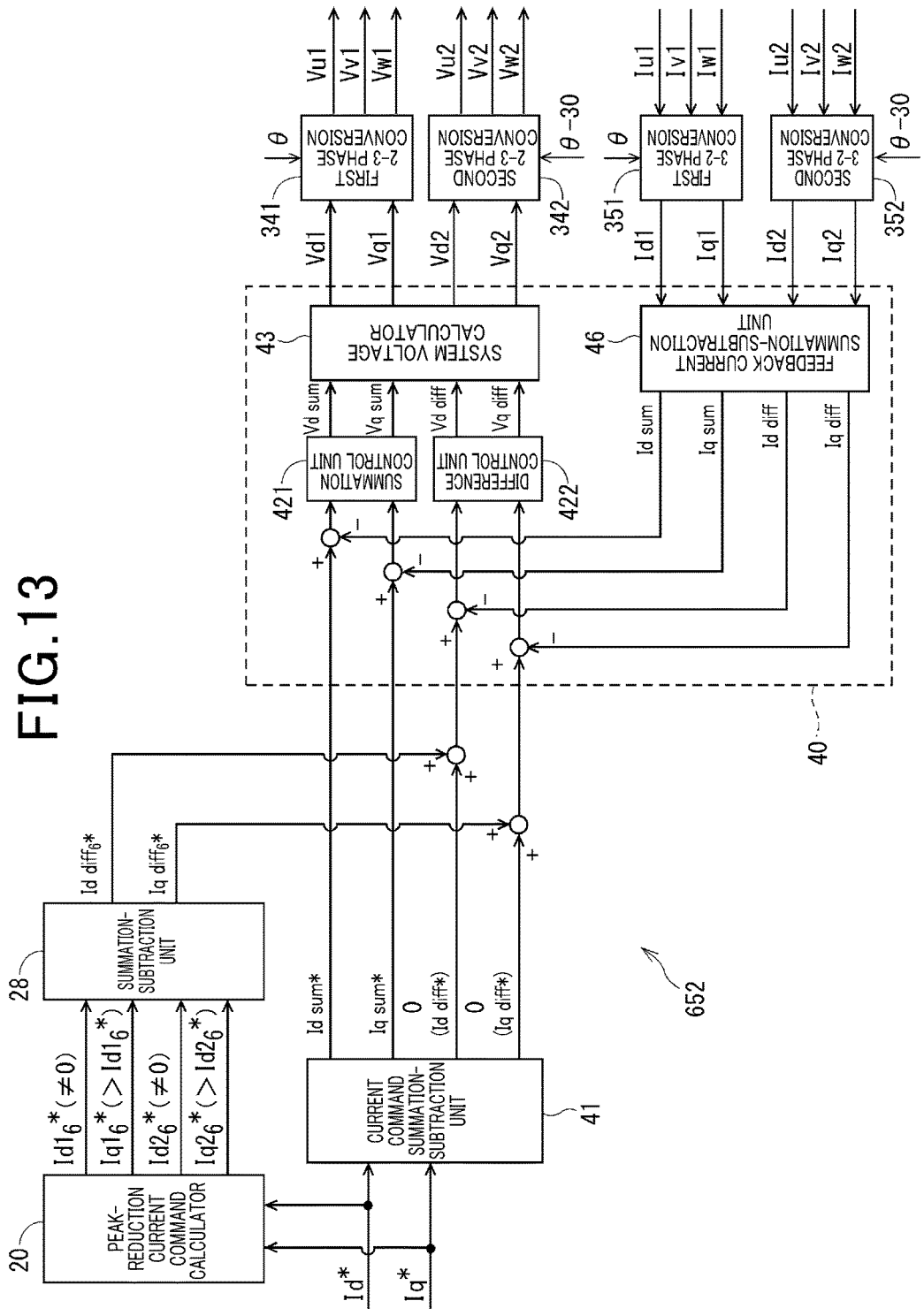
FIG. 13 is a block diagram showing a control unit according to a second embodiment.

The second embodiment will be described with reference to FIGS. 13, 14A and 14B.

The control unit 652 according to the second embodiment sets the amplitude of the 6th d-axis current $Id1_6^*$ and $Id2_6^*$ to be non-zero value, the 6th order d-axis current $Id1_6^*$ and $Id2_6^*$ being calculated by the peak-reduction current command calculator 20. Also, the amplitude of the 6th order q-axis current $Iq1_6^*$ and $Iq2_6^*$ are set to be larger than the amplitudes of the 6th order d-axis current $Id1_6^*$ and $Id2_6^*$. The differences Id $diff_6^*$ and Iq $diff_6^*$ calculated by the summation-subtraction unit 28 are added to the differences Id diff* and Iq diff* calculated by the current command summation-subtraction unit 41, that is, added to 0. Then, the summed current value is outputted to the current feedback calculator 40.

Figure 14A:
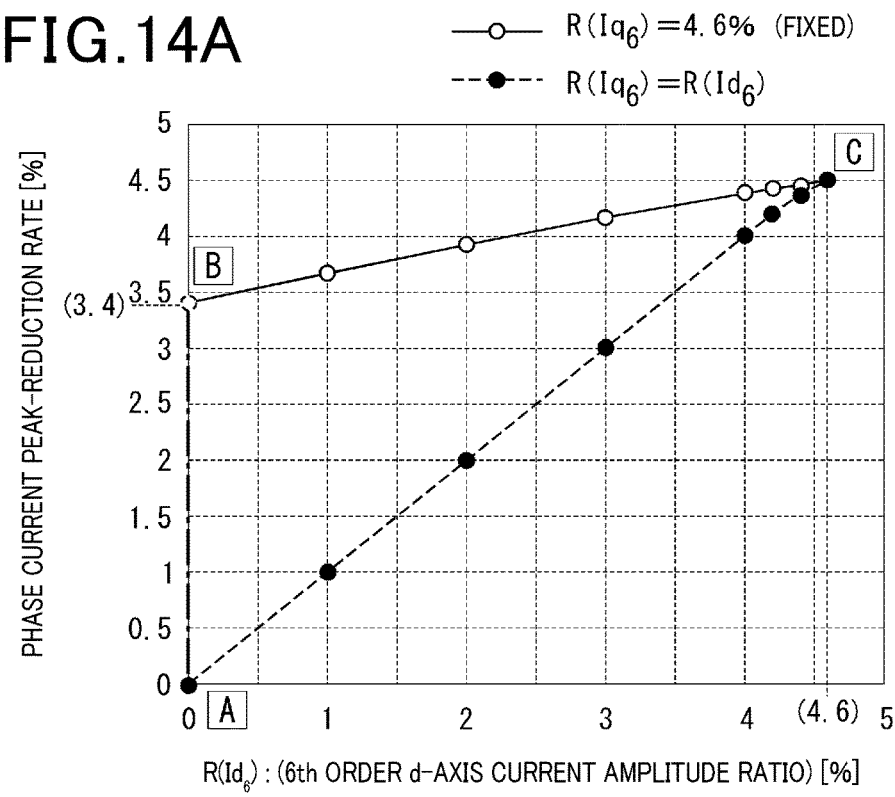
FIG. 14A is a graph showing a relationship between a 6th order d-axis current amplitude ratio and a phase-current peak reduction ratio.
Figure 14B:
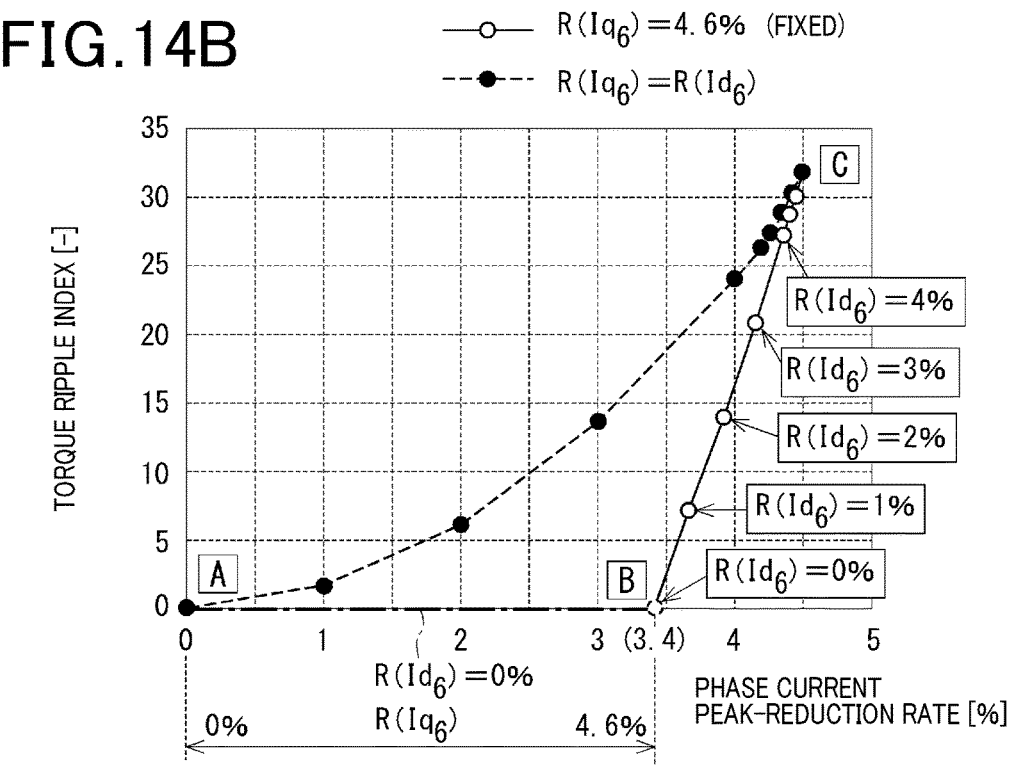
FIG. 14B is a graph showing a relationship between a phase-current peak reduction ratio and a torque ripple index.

FIGS. 14A and 14B show a comparison of characteristics between the second embodiment and the comparative example. In the second embodiment, the 6th order q-axis current amplitude ratio R ($Iq_6$) is set to be larger than the 6th order d-axis current amplitude ratio R ($Id_6$).

In the comparative example, the 6th order q-axis current amplitude ratio R ($Iq_6$) and the 6th order d-axis current amplitude ratio R ($Id_6$) are set to the same value. According to an example shown in FIGS. 14A and 14B, the maximum value of the 6th order q-axis current amplitude ratio R ($Iq_6$) is set to 4.6%. The 6th order d-axis current amplitude ratio R ($Id_6$) and the 6th order q-axis current amplitude ratio R ($Iq_6$) at points A, B and C shown in FIGS. 14A and 14B are as follows.

[Point A]: R ($Id_6$)=0%, R ($Iq_6$)=0%
[Point B]: R ($Id_6$)=0%, R ($Iq_6$)=4.6%
[Point C]: R ($Id_6$)=4.6%, R ($Iq_6$)=4.6%

According to the comparative example which is shown by black circles and dotted line arrows, 6th order d-axis current amplitude ratio R ($Id_6$) is changed between points A and C, maintaining the relationship R ($Id_6$)=R ($Iq_6$).

The amplitude ratio ($I_5$) of the phase current 5th harmonic and amplitude ratio ($I_7$) of the phase current 7th order harmonic are expressed by the following equations (6.1) and (6.2).

$$R(I_5)=(R(Id_6)+R(Iq_6))/2\times\sqrt{(2/3)} \quad (6.1)$$

$$R(I_7)=(R(Id_6)+R(Iq_6))/2\times\sqrt{(2/3)} \quad (6.2)$$

Therefore, when a condition R ($Id_6$)=R ($Iq_6$) is satisfied, the amplitude ratio R ($I_7$) corresponding to the 7th order harmonic becomes 0. In other words, the comparative example is based on a configuration in which only 5th order component of the phase current is superposed on the fundamental wave.

Meanwhile, according to the second embodiment which is shown by white circles and solid line arrows, a condition is fixed as R ($Iq_6$)=4.6%, and the 6th order d-axis current amplitude ratio R ($Id_6$) is changed between points B and C.

According to the second embodiment, the 6th order d-axis current amplitude ratio R ($Id_6$) is not 0, and the 6th order q-axis current amplitude ratio R ($Iq_6$) is larger than the 6th order d-axis current amplitude ratio R ($Id_6$), so that points B and C are not included. In other words, the second embodiment defines a range from a point immediately passing the point B to the point C. Hence, outlines of the white circles of points B are shown by a dotted lines.

It should be noted that the first embodiment defines a range shown by a dotted chain line, in which points A and B are included and the 6th order d-axis current amplitude ratio R ($Id_6$) is 0. When a condition is R ($Id_6$)=0, according to the equations (6.1) and (6.2), a condition R ($I_5$)=−R ($I_7$) is satisfied. In other words, 5th and 7th order components of the phase current are superposed, where the absolute value of the amplitude ratios are equal and the phases are opposite to each other. Hence, according to the first embodiment, amplitudes of the 5th and 7th order components of the phase current are combined.

However, according to the second embodiment where only a relationship of 0≠R ($Id_6$)<R ($Iq_6$) is defined, both of 5th and 7th order components of the phase current are superposed on the fundamental wave, and amplitude combinations of the 5th order component and the 7th order component of the phase current can be widely selected.

FIG. 14A shows a relationship between the 6th order d-axis current amplitude ratio R ($Id_6$) and the phase current peak-reduction ratio. In the comparative example, when the 6th order d-axis current amplitude ration R ($Id_6$) increases from 0% to 4.6%, the phase current peak-reduction ratio increases from 0% to approximately 4.5%. In the second embodiment, when the 6th order d-axis current amplitude ratio R ($Id_6$) increases from 0% to 4.6%, the phase current peak-reduction ratio increases from approximately 3.4% to approximately 4.5%.

FIG. 14B shows a relationship between the torque ripple index and the phase current peak-reduction ratio. The torque ripple index is a non-dimensional number calculated by the equation (7), torque ripple index being converted to a torque value by multiplying a proportionality constant based on characteristics of the motor 80. Here, in order to perform relative comparison, index value is used.

$$\text{torque ripple index}=1.5\times R(Id_6)[\%]\times R(Iq_6)[\%] \quad (7)$$

Smaller torque ripple index is preferably used, in view of reducing noise and vibration of the motor 80. The torque ripple index is 0 in a range where the 6th order d-axis current amplitude ratio R ($Id_6$) between points A and B is 0%.

In a comparative example, the torque ripple index increases being approximately proportional to the square of the phase current peak-reduction ratio. In other words, to reduce the phase current peak, the 6th order dq-axis current is superposed on the fundamental wave, whereby the 12th order torque ripple increases in a parabolic curve.

According to the second embodiment, the 6th order d-axis current amplitude ratio R ($Id_6$) is increased from 0% to 4.6%, towards point C from point B. As a result, the phase current peak-reduction ratio can be further increased from 3.4%, but torque ripple increases as well.

Accordingly, a target value is preferably determined with a consideration of balance in requirements of reducing the phase current peak and of reducing the torque ripple in a realistic system to which the present disclosure is applied. For example, when a peak-reduction of the phase current is more required to reduce heat and power loss, point C is preferably used as a target, and when a reduction of torque ripple is more required to reduce noise and a vibration, point B is preferably used as a target.

Also, when a fixed value of the 6th order q-axis current amplitude ratio R ($Iq_6$) is set to be smaller than 4.6%, the characteristics curve connecting the point B and point C is moved towards A point side. Even in this case, an operational range of the second embodiment corresponds to a lower area than an area defined by the dotted line shown in the comparative example. Specifically, according to the second embodiment, compared to the comparative example, torque ripples corresponding to the same phase current peak-reduction ratio can be reduced.

Third Embodiment

Figure 15:
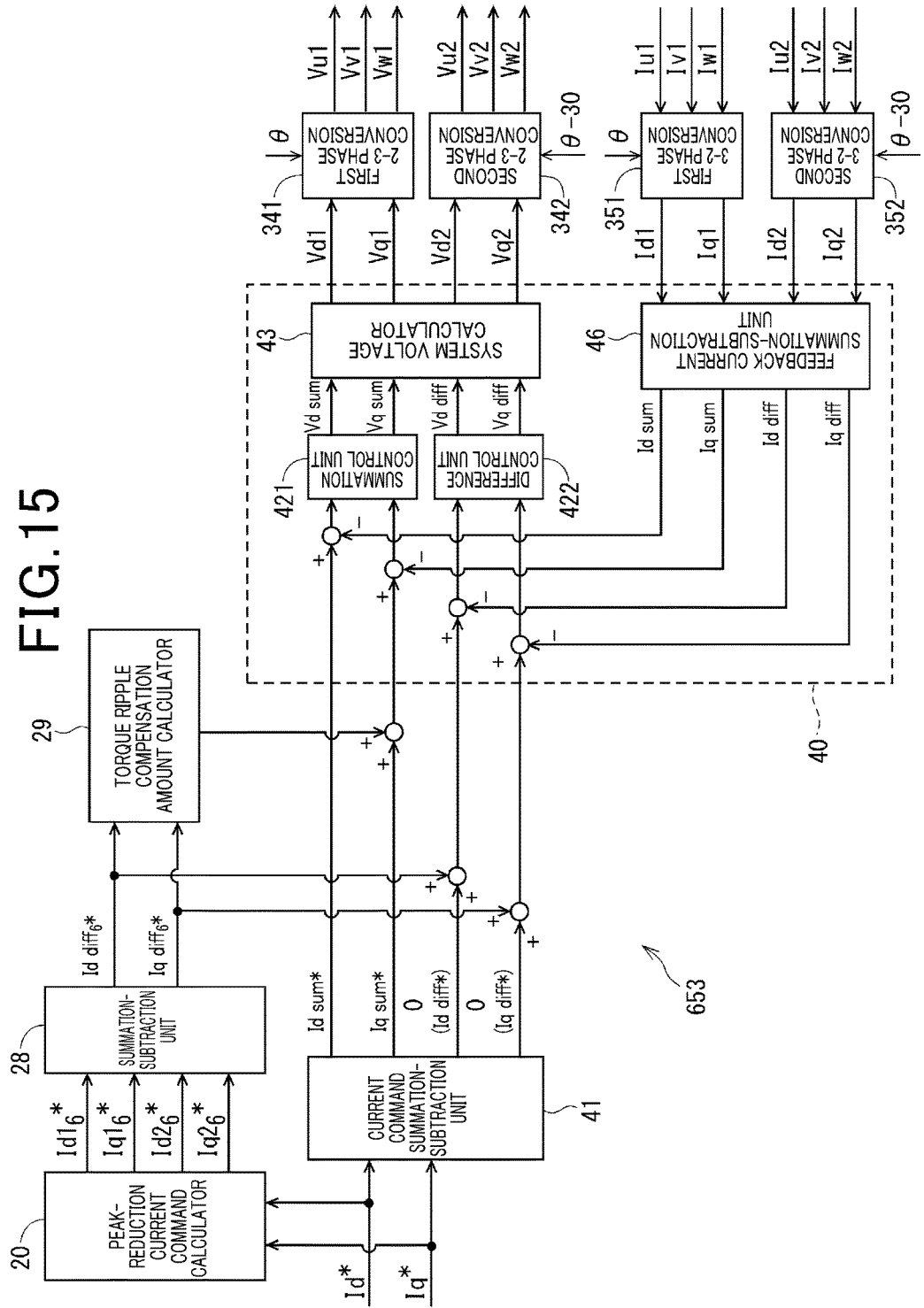
FIG. 15 is a block diagram showing a control unit according to a third embodiment.

With reference to FIG. 15, the third embodiment will be described.

The control unit 653 according to the third embodiment further includes a torque ripple compensation amount calculator 29 that calculates a compensation amount of torque ripple in 12th order component of the reluctance torque, which is produced based on the product of amplitudes of the 6th dq-axis current. In a configuration shown in FIG. 15 where feedback control is performed for sum and subtraction of current commands between the two systems, the torque ripple compensation amount calculator 29 acquires Id diff$_6$* and Iq diff$_6$* which are differences in the 6th order dq-axis current. The compensation amount calculated by the torque ripple compensation amount calculator 29 is added to Iq sum* which is a sum of q-axis current commands in the two systems.

Specifically, the torque ripples in the one system is calculated based on the product of (Id diff$_6$/2) and (Iq diff$_6$/2). Then, a value which is a doubled compensation amount for the one system is added to Iq sum* which is a sum of q-axis current commands in the two systems.

As a realistic target, a product of the 6th order d-axis current and 6th order q-axis current for the one system may preferably be set to 1/10 or less of a 0 order component of the q-axis current.

According to the third embodiment, 6th order dq-axis current Id$_6$ and Iq$_6$ are calculated to obtain sufficient reduction effect of the phase current peak, and the q-axis current is conducted so as to compensate the 12th torque ripples produced by the 6th order dq-axis current Id$_6$ and Iq$_6$. Thus, both of a peak reduction effect of the phase current and an effect of reducing the torque ripples can be favorably achieved.

Even in a case of a condition Id diff$_6$=0 as described in the first embodiment, the torque ripple compensation amount calculator 29 may calculate a compensation amount to be 0 by using a common calculation algorithm.

Forth Embodiment

Figure 16:
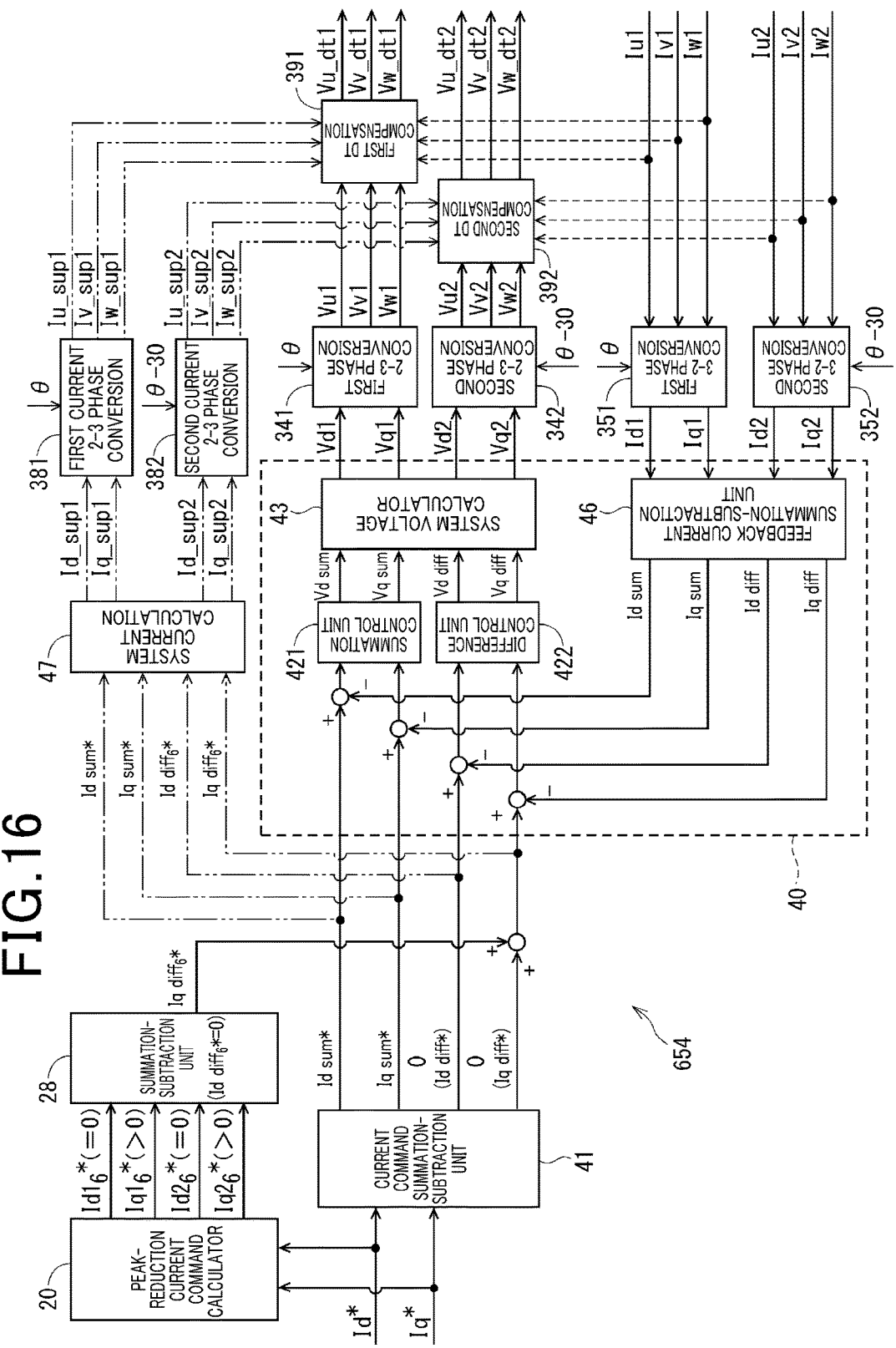
FIG. 16 is a block diagram showing a control unit according to a fourth embodiment.

With reference to FIG. 16, the fourth embodiment will be described.

The control unit 654 according to the fourth embodiment further includes a configuration for compensating a dead time of three-phase voltage command values Vu1, Vv1, Vw1, Vu2, Vv2 and Vw2, in addition to the configuration of the control unit 651 of the first embodiment. The dead time compensation is a technique in which a voltage command is compensated to cancel influences of the dead time, whereby a voltage utilization rate can be improved and distortion of the line voltage can be reduced.

The dead time compensation units (abbreviated to DT compensation unit in the drawings) 391 and 392 compensates the three-phase voltage commands values Vu1, Vv1, Vw1, Vu2, Vv2 and Vw2 so as to cancel influences of the dead time, and outputs the compensated voltages Vu_dt1, Vv_dt1, Vw_dt1, Vu_dt2, Vv_dt2, and Vw_dt2. In the calculation, the dead time compensation units 391 and 392 are required to determine polarities of the phase current.

The dead time compensation units 391 and 392 are configured to determine the polarities of the phase current based on the three-phase superposition current command which is a current value composed of sum of the first, 5th and 7th order components of the phase current. This configuration is shown with two-dotted line.

According to this configuration, four values of Id sum*, Iq sum*, Id diff$_6$*(=0), and a sum of Iq diff*(=0) and Iq diff$_6$* produced based on outputs of the current command summation-subtraction unit 41 and the summation-subtraction unit 28, are outputted to a system voltage calculator 47 in addition to the summation control unit 421 and the difference controlling unit 422.

The system voltage calculator 47 converts the four values into the dq-axis superposition current command Id_sup1, Iq_sup1, Id_sup2, and Iq_sup2 for the first and second systems, and outputs the converted value to current 2 to 3 phase conversion units 381 and 382.

The dq-axis superposition current command Id_sup1, Iq_sup1, Id_sup2, and Iq_sup2 are defined by equations (8.1)-(8.4)

$$Id\_sup1=Id1^*+Id1_6^*=Id1^* \quad (8.1)$$

$$Iq\_sup1=Iq1^*+Iq1_6^* \quad (8.2)$$

$$Id\_sup2=Id2^*+Id2_6^*=Id2^* \quad (8.3)$$

$$Iq\_sup2=Iq2^*+Iq2_6^* \quad (8.4)$$

The current 2 to 3 phase conversion units 381 and 382 perform 2-3 phase conversion, by using electrical angles θ and θ-30, dq-axis superposition current command Id_sup1, Iq_sup1, Id_sup2, and Iq_sup2 into three-phase superposition current command Iu_sup1, Iv_sup1, Iw_sup1, Iu_sup2, Iv_sup2 and Iw_sup2, and outputs the converted values to the dead time compensation units 391 and 392. The dead time compensation units 391 and 392 determine polarities of the phase current based on the acquired three-phase superposition current command.

In FIG. 16, to distinguish the current 2-3 phase conversion units 381 and 382 and the 2-3 phase conversion units 341 and 342, the 2-3 phase conversion units 341 and 342 are labelled as voltage 2-3 phase conversion units 341 and 342.

In FIG. 16, input-output signals are shown by dotted lines in the configuration where the dead time compensation units 391 and 392 determine the polarities of the phase current based on the actual current.

In this configuration, actual current detected by the current sensors 701 and 702, i.e., Iu1, Iv1, Iw1, Iu2, Iv2 and Iw2 are transmitted to the 3-2 phase conversion units 351 and 352 and to the dead time compensation units 391 and 392 as well.

The control unit 654 according to the fourth embodiment is provided with dead time compensation units 391 and 392 that compensate the voltage based on the polarities of the phase current so as to cancel an influence of the dead time on the voltage applied to the motor 80. Thus, the voltage utilization rate is improved and distortion of the line voltage can be reduced.

Other Embodiments (a) According to the above-described embodiments, a surface magnet type rotary electric machine is employed as a typical three-phase rotary electric machine that produces torque where magnet torque and reluctance torque are summed. However, since even the surface magnet type rotary electric machine sometimes produces small reluctance torque, the configuration of the present disclosure can be applied to a control apparatus of a surface magnet type rotary electric machine.

(b) In the above-described embodiments, a control for current amplitudes of dq-axis 6th order component is described, the dq-axis 6th order component being converted to 5th and 7th components of the phase current in the three-phase rotary electric machine. This control can be applied to various order components generally expressed as 6 (2k+1)th order, where k=or 0 or more integer numbers, such as 18th and 30th components, other than dq-axis 6th components. The order-number of reluctance torque ripples produced based on a product of amplitudes of dq-axis current in 6 (2k+1)th order components, is 12th, 36th and 60th order components which are generally expressed by 12 (2k+1)th order.

(c) According to the above-described embodiments, a configuration is employed in which feedback control is performed for sum and subtraction between the dq-axis current commands. However, it is not limited to this configuration. For example, feedback control is performed for current command value of each system.

(d) Specific configurations for the control apparatus of the three-phase rotary electric machine is not limited to configurations exemplified in FIGS. 2 and 3 of the above-described embodiments. For example, switching elements of the inverters may be configured of field effect transistors other than MOSFETs or may be configured of IGBTs or the like.

(e) The control apparatus of the three-phase rotary electric machine according to the present disclosure is not limited to a control apparatus of a steering assist motor of an electric power steering apparatus, but may be applied to a control apparatus for other three-phase motor or a generator.

As described, the present disclosure is not limited to the above-described embodiments, but may be modified in various ways without departing the scope of the present disclosure.

What is claimed is:

1. A control apparatus for driving a three-phase rotary electric machine having two three-phase winding groups, the three-phase rotary electric machine generating torque which is a sum of magnet torque and reluctance torque when AC current having mutually different phases is conducted through the two winding groups, the control apparatus comprising:

two power converters each provided for a corresponding one of two winding groups, each power converter supplying AC current to each of the two winding groups, the AC current supplied to the two winding groups have the same amplitude and the mutually different phases defined as 30±60×n[deg], where n is integer number; and a control unit configured to calculate d-axis current and q-axis current of 6 (2k+1)th order component superposed on a fundamental wave component on a dq coordinate, where k=0 or more integer number, so as to reduce a peak value of a first order component in phase current conducted in the two winding groups, thereby controlling conduction of the three-phase rotary electric machine, wherein the control unit is configured to calculate current such that an amplitude of the q-axis current of the 6 (2k+1)th order component is larger than an amplitude of the d-axis current of the 6 (2k+1)th order component.

2. The control apparatus according to claim 1, wherein the control unit is configured to set an amplitude of the d-axis current of the 6 (2k+1)th order component to be 0.

3. The control apparatus according to claim 1, wherein the control unit further includes a torque ripple compensation amount calculator that calculates a compensation amount of a torque ripple of 12 (2k+1)th order component produced based on a product of amplitudes of the d-axis current and the q-axis current of the 6 (2k+1)th order component; and the control unit adds the compensation amount of the torque ripple to the q-axis current, the compensation amount of the torque ripple being calculated by the torque ripple compensation amount calculator.

4. The control apparatus according to claim 1, wherein the control apparatus is adapted for an electric power steering apparatus of a vehicle, and controls driving of a steering assist motor as the three-phase rotary electric machine.

* * * * *